United States Patent
Lozier et al.

(10) Patent No.: US 8,627,667 B2
(45) Date of Patent: Jan. 14, 2014

(54) GAS TURBINE ENGINE DUCT HAVING A COUPLED FLUID VOLUME

(75) Inventors: Thomas S. Lozier, Lebanon, IN (US); Mark E. Bowman, Indianapolis, IN (US); Gregory D. Cathcart, Carml, IN (US); Ronald P. Porter, Carmel, IN (US)

(73) Assignee: Roll-Royce Corporation, Indianapolis, IN (US)

( * ) Notice: Subject to any disclaimer, the term of this patent is extended or adjusted under 35 U.S.C. 154(b) by 37 days.

(21) Appl. No.: 12/715,961

(22) Filed: Mar. 2, 2010
(Under 37 CFR 1.47)

(65) Prior Publication Data
US 2010/0326048 A1 Dec. 30, 2010

Related U.S. Application Data

(63) Continuation of application No. 12/544,019, filed on Aug. 19, 2009, now abandoned.

(60) Provisional application No. 61/203,772, filed on Dec. 29, 2008.

(51) Int. Cl.
*F02C 7/141* (2006.01)

(52) U.S. Cl.
USPC ............................. 60/772; 60/39.08; 60/267

(58) Field of Classification Search
USPC ............. 60/39.08, 226.1, 262, 267, 266, 772
See application file for complete search history.

(56) References Cited

U.S. PATENT DOCUMENTS

| | | | | |
|---|---|---|---|---|
| 2,703,674 A | * | 3/1955 | Wood | 417/371 |
| 2,731,239 A | * | 1/1956 | Andersen | 165/299 |
| 3,066,702 A | * | 12/1962 | Tumavicus | 138/111 |
| 3,721,389 A | * | 3/1973 | MacKinnon et al. | 239/265.19 |
| 3,797,561 A | * | 3/1974 | Clark et al. | 60/39.08 |
| 4,136,516 A | | 1/1979 | Corsmeier | |
| 4,137,705 A | * | 2/1979 | Andersen et al. | 60/39.08 |
| 4,170,873 A | | 10/1979 | Milo | |
| 4,190,398 A | | 2/1980 | Corsmeier et al. | |
| 4,914,904 A | * | 4/1990 | Parnes et al. | 60/226.1 |
| 5,121,598 A | | 6/1992 | Butler | |
| 5,177,951 A | | 1/1993 | Butler | |
| 5,438,823 A | | 8/1995 | Loxley et al. | |
| 5,581,996 A | * | 12/1996 | Koch et al. | 60/782 |
| 6,058,696 A | * | 5/2000 | Nikkanen et al. | 60/226.1 |
| 6,134,874 A | | 10/2000 | Stoten | |
| 6,609,592 B2 | * | 8/2003 | Wilson | 181/292 |
| 6,920,750 B2 | * | 7/2005 | Haggander et al. | 60/267 |
| 7,131,612 B2 | * | 11/2006 | Baptist et al. | 244/134 R |
| 7,377,100 B2 | | 5/2008 | Bruno et al. | |
| 7,647,761 B2 | * | 1/2010 | Gauthier et al. | 60/39.08 |
| 7,658,077 B2 | * | 2/2010 | Earith et al. | 60/779 |
| 7,810,311 B2 | * | 10/2010 | Schwarz et al. | 60/266 |
| 7,845,159 B2 | * | 12/2010 | Venkataramani et al. | 60/267 |
| 7,861,512 B2 | * | 1/2011 | Olver et al. | 60/226.1 |
| 8,127,828 B2 | * | 3/2012 | Schwarz et al. | 165/41 |
| 8,468,795 B2 | * | 6/2013 | Suciu et al. | 60/226.1 |

(Continued)

*Primary Examiner* — William H Rodriguez
*Assistant Examiner* — Michael B Mantyla
(74) *Attorney, Agent, or Firm* — Krieg DeVault LLP

(57) ABSTRACT

A fluid tank structure is disclosed that is integrated within a bypass duct of a turbofan gas turbine engine. The fluid tank structure includes a hollow interior that is closed off when the fluid tank structure is coupled with an inner wall of the bypass duct. The inner wall forms one wall of a fluid tank volume enclosed by the fluid tank structure.

20 Claims, 4 Drawing Sheets

(56) References Cited

U.S. PATENT DOCUMENTS

| | | | |
|---|---|---|---|
| 2005/0268612 A1* | 12/2005 | Rolt | 60/728 |
| 2006/0042223 A1* | 3/2006 | Walker et al. | 60/39.08 |
| 2006/0042225 A1* | 3/2006 | Bruno et al. | 60/204 |
| 2007/0245738 A1* | 10/2007 | Stretton et al. | 60/728 |
| 2008/0053059 A1* | 3/2008 | Olver et al. | 60/226.1 |

* cited by examiner

GAS TURBINE ENGINE DUCT HAVING A COUPLED FLUID VOLUME

CROSS REFERENCE TO RELATED APPLICATIONS

The present application is a continuation of U.S. patent application Ser. No. 12/544,019, filed Aug. 19, 2009 now abandoned, which claims benefit of U.S. Provisional Patent Application No. 61/203,772, filed Dec. 29, 2008, each of which is incorporated herein by reference.

TECHNICAL FIELD

The present invention generally relates to gas turbine engine bypass ducts, and more particularly, but not exclusively, to bypass ducts having fluid tanks.

BACKGROUND

Incorporating fluid tanks with bypass ducts of gas turbine engines remains an area of interest. Some existing systems have various shortcomings relative to certain applications. Accordingly, there remains a need for further contributions in this area of technology.

SUMMARY

One embodiment of the present invention is a unique bypass duct having a fluid tank. Other embodiments include apparatuses, systems, devices, hardware, methods, and combinations for incorporating fluid tanks into bypass ducts of gas turbine engines. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
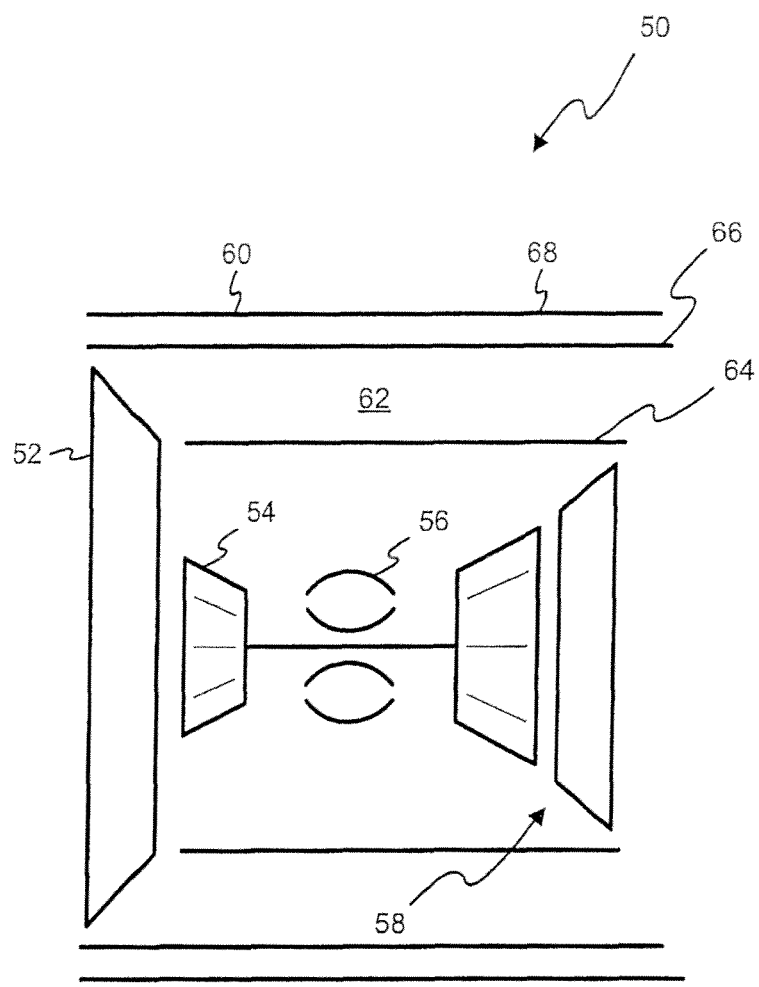
FIG. 1 depicts one form of a gas turbine engine having a bypass duct.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, there is illustrated a schematic representation of one form of an engine 50 that can be used as a powerplant for an aircraft. As used herein, the term "aircraft" includes, but is not limited to, airplanes, fixed wing vehicles, variable wing vehicles, unmanned combat aerial vehicles, tailless aircraft, and other airborne and/or extraterrestrial (spacecraft) vehicles. Further, the present inventions are contemplated for utilization in other applications that may not be coupled with an aircraft such as, for example, industrial applications, power generation, pumping sets, naval propulsion and other applications known to one of ordinary skill in the art.

In one form the engine 50 is a gas turbine engine and includes a fan 52, compressor 54, combustor 56 and turbine 58. Though the engine 50 is depicted as an axial flow gas turbine engine having only a single spool, other engines 50 may include additional spools and/or may be a mixed axial/centrifugal flow engines. In the illustrated embodiment the engine 50 is enclosed by a bypass duct 60 which forms a bypass passage 62 between it and a flow path member 64. In some applications the flow path member 64 can be a casing of the engine 50. The bypass duct 60 includes an inner wall 66 and an outer wall 68.

Figure 2:
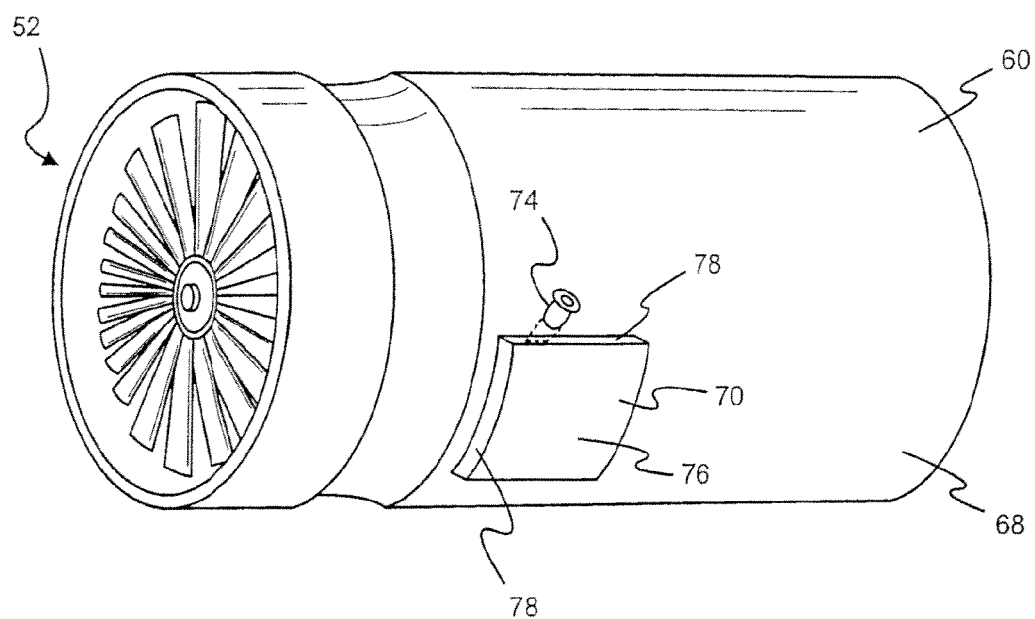
FIG. 2 depicts one embodiment of a bypass duct having a fluid tank.
Figure 3:
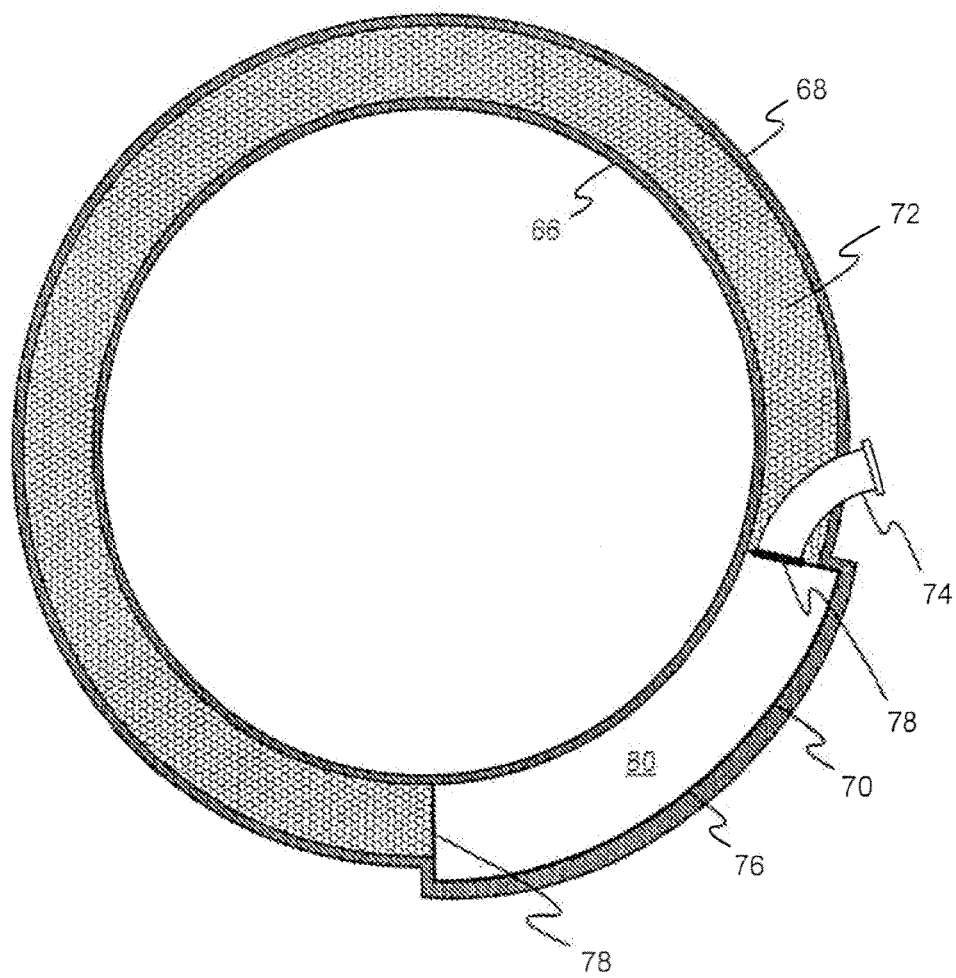
FIG. 3 depicts one embodiment of a bypass duct having a fluid tank.

Turning now to FIGS. 2 and 3, one embodiment of the present application is disclosed. The bypass duct 60 includes a tank structure 70 and a structural member 72. The illustrated embodiment also includes a fill tube 74. In one form the inner wall 66 and the outer wall 68 are formed of a composite material such as a carbon composite, but in other embodiments the inner wall 66 and outer wall 68 can be made from different materials. Furthermore, the inner wall 66 can be composed of a material different than that of the outer wall 68. In some embodiments the inner wall 66 and/or outer wall 68 can be created from multiple components that can have different material properties. The inner wall 66 can extend the entire length of the engine 50, but in some embodiments may extend over a smaller portion of the engine 50. Though the outer wall 68 is depicted in FIG. 2 as extending from the forward part to the aft part of the engine 50, in some embodiments the outer wall 68 may extend over a smaller portion of the engine 50. The outer wall 68 is depicted in the illustrative embodiment as extending over the entirety of the tank structure 70, but in some embodiments the outer wall 68 may only extend over portions of the tank structure 70 such that one or more surfaces of the tank structure 70 may be viewable from the exterior position of the bypass duct 60.

The tank structure 70 is coupled to the inner wall 66 to form a fluid volume 80 and both are used to contain a fluid such as oil within the fluid volume 80. In some forms the tank structure 70 includes a hollow interior 81. In the illustrated embodiment the tank structure 70 includes a base 76 and sides 78 forming a hollow interior, but in other embodiments the tank structure 70 can take on a form that does not have a clear demarcation between the base 76 and the sides 78 such as, but not limited to, a hemispherical shape. In still other forms the tank structure 70 may only include the base 76 which can be attached to the inner wall 66 or structure protruding from the inner wall 66. The shape of the tank structure 70 in the illustrated embodiment, at least as viewed in an isometric or perspective projection view, is quadrilateral, but in other embodiments can take on other shapes or forms. The tank structure 70 can be located in any circumferential location around the engine 50 though in the illustrative embodiment it is depicted in a location near the bottom. The tank structure 70 can be made from a variety of materials. In one non-limiting form the tank structure is made of 6-4 titanium, but other embodiments can be made with other materials.

In the illustrative form the tank structure 70 is fastened to the inner wall 66 when an edge of the tank structure 70 contacts the inner wall 66. When fastened, the exterior surface of the tank structure 70 can be at a radial position such that a hump or bump is formed in the outer surface of outer wall 68 as can be seen in FIG. 2. In some forms the tank structure 70 can be at a radial position such that a hump or bump is not formed. In still further embodiments a depression may be formed if the tank structure 70 does not extend to the outer wall 68. In some forms the structural member 72 can be located between the tank structure 70 and the outer wall 68.

In some embodiments the sides 78 extend from the base 76 and are used to define the fluid volume 80. The sides 78 can be any variety of lengths sufficient to assist in establishing the fluid volume 80. In the illustrative form the sides 78 extend from the base 76 to the inner wall 66, but in other forms the sides 78 can extend partially from the base 76 and be affixed to a structure extending from the inner wall 66. The sides 78 can be made of the same material as the base 76 but in some forms can take on different material types. In one non-limiting example the sides 78 can be carbon composite. The sides 78 can be separate structures that are formed individually and brought together during assembly of the tank structure 70. In some forms two or more sides 78 can be formed together and affixed to other sides 78. In still other forms the sides 78 can be one complete unitary structure. In still other forms the sides 78 can be made unitary with the base 76. The tank structure 70 in the illustrative embodiment includes four sides 78, but when the tank structure takes on different shapes there can be any number of sides 78. To set forth just one non-limiting example, if the tank structure 70 is circular in shape, a single side 78 can be used to extend between the base 76 and the inner wall 66. If the tank structure 70 includes multiple sides 78 not all sides 78 need be made from the same material. In some forms the sides 78 may have flanges formed in its ends that can be used to be attached to the inner wall 66. In some forms the sides 78 can have a corrugated shape or can take on other forms. Other variations are also contemplated herein.

The base 76 is used to at least partially define the radially outer boundary of the fluid volume 80. In the illustrative embodiment the base 76 takes on a quadrilateral shape having a curved surface along the circumferential direction, but in other embodiments the base 76 can take on other shapes such as triangular or circular, to set forth just a few non-limiting examples. In some embodiments, the base 76 can be flat. The base 76 can have a corrugated shape and it can be textured depending upon the requirements of any given application. Other variations are also contemplated herein.

The fill tube 74 is used to provide a conduit to supply the fluid volume 80 with a fluid. In the illustrative embodiment the fill tube 74 extends from one of the sides 78, through the structural member 72, and out the outer wall 68. In other embodiments the fill tube 74 may extend from the base 76 and through the outer wall 68 and/or any intervening structure therebetween, such as, but not limited to, the structural member 72.

The structural member 72 is used to provide structural support for the bypass duct 60 and can be used to couple the inner wall 66 to the outer wall 68. In the illustrative embodiment the structural member 72 is a honeycomb structure but in other forms the structural member 72 can take on a variety of forms. In one embodiment in the example the structural member 72 can be composed of a number of support ribs or other type of structure. The structural member 72 furthermore can take on different forms depending upon, for example, the circumferential, radial, or axial location of the structural member 72. To set forth just one non-limiting example, the structural member can take on a honeycomb-like structure in a forward portion of the bypass duct 60, but in an aft portion it can take on a form such as a support ribs.

Figure 4:
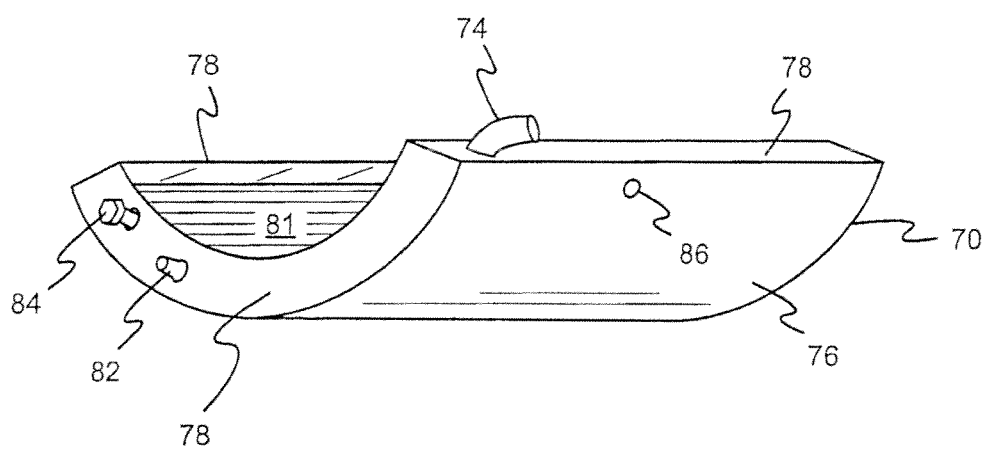
FIG. 4 depicts one embodiment of a tank structure.

Turning now to FIG. 4, one embodiment of the tank structure 70 is depicted separated from the inner wall 66 and outer wall 68. The tank structure in this embodiment includes a hollow interior 81, at least part of which becomes the fluid volume 80 when the tank structure 70 is constructed against the inner wall 66. The illustrated embodiment also includes passages such as outline 82 and drain plug 84, and in other embodiments can include any number of other passages used to convey a fluid into or out of the fluid volume 80. The tank structure also includes a site gauge 86.

The site gauge 86 is used to determine the status of a fluid within the fluid volume 80. The status can include an indication of whether a fluid is present in the tank and/or an indication of a volume of the fluid. In one form the site gauge 86 is a translucent member. In other forms the site gauge 86 can be a clear window through which the fluid within the fluid volume 80 can be observed. Though the site gauge 86 is shown as a circular window in the illustrated embodiment, in other forms the site gauge 86 can take on other forms such as an elongate shape that can extend from near the top of the tank structure 70 to the bottom of the tank structure 70, to set forth just one non-limiting example. The outer wall 68 can be used to cover all of the base 76 of the tank structure 70 with the exception of the area in close proximity to the site gauge 86. In other forms the outer wall 68 can be cut back to reveal not only the site gauge 86 but also a surface of the tank structure 70. In still further forms the outer wall 68 can be cut back to expose all of the tank structure 70.

One aspect of the present application provides a fluid tank integrated within a bypass duct of a turbofan engine. The fluid tank can be located between the inner wall and the outer wall of the bypass duct. One wall of the fluid tank is formed by the inner wall of the bypass duct. A tank structure having a base and sides can be formed and fastened to the inner wall.

One embodiment of the present application provides an apparatus comprising a fan bypass duct wall having a bypass duct wall first side operable to direct a flow of air in an annular bypass passage of a turbofan engine, the fan bypass duct wall also having a bypass duct wall second side; a fluid tank bowl having a hollow interior and coupled to the fan bypass duct wall second side; and a fluid tank volume formed between the bypass duct wall second side and the fluid tank bowl, the fan bypass duct wall defining a fluid boundary of the fluid tank volume.

One form of the present application provides an apparatus comprising: a turbofan bypass duct portion having a fluid tank disposed between a first wall and a second wall and a structural core operable to provide strength to the turbofan bypass duct portion, the fluid tank engaged to the first wall and structured to form a space bounded by the fluid tank and the first wall, the space operable to receive a fluid that contacts the fluid tank and the first wall.

Another form of the present application provides an apparatus comprising a gas turbine engine bypass duct; and means for containing oil within the gas turbine engine bypass duct.

Yet another form of the present application provides a method comprising forming a fluid tank volume by engaging a fluid tank structure with a portion of a gas turbine engine bypass duct wall; fastening the fluid tank structure to the portion to secure the fluid tank structure to the gas turbine engine bypass duct wall; enclosing the fluid tank structure between the gas turbine engine bypass duct wall and a second gas turbine engine bypass duct wall; and supporting the gas turbine engine bypass duct wall with a core structure located between the gas turbine engine bypass duct wall and the second gas turbine engine bypass duct wall.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A gas turbine engine apparatus comprising:
a radially inner fan bypass duct wall having a bypass duct wall first side operable to direct a flow of air in an annular bypass passage of a turbofan engine, the radially inner fan bypass duct wall also having a bypass duct wall second side;
a fluid oil tank bowl having a bottom and at least two sides that extend from the bottom to the fan bypass duct wall second side to create a hollow interior, the sides of the bowl having a portion that is coupled to the fan bypass duct wall second side; and
a fluid tank volume formed between the bypass duct wall second side and the fluid oil tank bowl and confined within a half cylinder of the radially inner fan bypass duct wall, the bypass duct wall second side of the radially inner fan bypass duct wall defining a fluid boundary of the fluid tank volume;
wherein the radially inner fan bypass duct wall is disposed radially external to the flow of air of the annular bypass passage of the turbofan engine.

2. The apparatus of claim 1, wherein the fluid tank volume is operable to receive a quantity of oil.

3. The apparatus of claim 1, which further includes a radially outer bypass duct wall disposed at the side of the bypass duct wall second side.

4. The apparatus of claim 3, wherein the fluid oil tank bowl is disposed between the radially inner fan bypass duct wall and the radially outer bypass duct wall.

5. The apparatus of claim 3, which further includes a structured core disposed between the radially inner fan bypass duct wall and the radially outer bypass duct wall.

6. The apparatus of claim 5, wherein the structured core is a honeycomb shaped construction.

7. The apparatus of claim 1, wherein the fluid oil tank further includes a feed line traversing through the radially inner fan bypass duct wall and useful to provide a conduit through which a fluid may be received within the fluid oil tank bowl.

8. The apparatus of claim 1, wherein the fluid oil tank bowl has sides coupled to the bypass duct wall second side.

9. An apparatus comprising:
a turbofan bypass duct portion having a fluid oil tank bowl disposed between a radially inner wall and a radially outer wall and a structural core configured to provide strength to the turbofan bypass duct portion substantially across a radial space between the radially inner wall and radially outer wall of the turbofan bypass duct portion, wherein the radially inner wall has an inner side and an outer side, the inner side forming a flow path boundary for passage of bypass air, and wherein the fluid oil tank bowl has a bottom and at least two sides that extend from the bottom to the outer side of the radially inner wall, and wherein the fluid oil tank bowl is engaged to the outer side of the radially inner wall and is structured to form a space bounded by the fluid oil tank bowl and the outer side of the radially inner wall, the space operable to receive a fluid that contacts the fluid oil tank bowl and the outer side of the radially inner wall.

10. The apparatus of claim 9, wherein the radially inner wall is a radially inner wall of an annular turbofan bypass passage formed by the turbofan bypass duct portion.

11. The apparatus of claim 9, wherein the fluid oil tank bowl has one or more of the at least two sides engaged to the outer side of the radially inner wall.

12. The apparatus of claim 9, wherein the fluid oil tank bowl is bonded to the radially inner wall.

13. The apparatus of claim 9, wherein a fluid operable to be contained in the fluid oil tank bowl is oil.

14. The apparatus of claim 9, wherein the structural core is a honeycomb configured structure.

15. The apparatus of claim 9, which further includes a sight gauge useful for determining a status of a fluid contained within the fluid oil tank bowl, the radially outer wall including an aperture through which the sight gauge can be viewed.

16. The apparatus of claim 9, which further includes an air/oil separator.

17. An apparatus comprising:
a gas turbine engine bypass duct having a first wall offset from a second wall, wherein a radially inward facing side of the first wall is operable to direct a flow of air in an annular bypass passage of a turbofan engine; and
means for containing oil within the gas turbine engine bypass duct, the means located between the first wall and second wall, wherein the means for containing oil has a bottom and at least two sides that extend from the bottom to a radially outward facing side of the first wall to define a fluid tank volume, the radially outward facing side of the first wall defining a fluid boundary of the fluid tank volume;
wherein the gas turbine engine duct, and the means located between the first wall and second wall, are disposed radially external to the flow of air in the annular bypass passage of the turbofan engine.

18. A method comprising:
providing a gas turbine engine bypass duct wall having a radially inward side and a radially outward side opposite that of the radially inward side, and configuring the radially inward side to be operable to direct a flow of air in an annular bypass passage of a turbofan engine;
forming a fluid tank volume by engaging a fluid oil tank structure with a portion of the radially outward side of the gas turbine engine bypass duct wall, wherein the fluid oil tank structure has a bottom and at least two sides that extend from the bottom to the radially outward side of the fluid oil tank structure;
fastening the fluid oil tank structure to the portion of the radially outward side of the gas turbine engine bypass duct wall to secure the fluid oil tank structure to the radially outward side of the gas turbine engine bypass duct wall, the radially outward side defining a fluid boundary of the fluid tank volume;
enclosing the fluid oil tank structure between the gas turbine engine bypass duct wall and a second gas turbine engine bypass duct wall; and
supporting the gas turbine engine bypass duct wall with a core structure that provides a load path that directly connects the gas turbine engine bypass duct wall and the second gas turbine engine bypass duct wall.

19. The method of claim 18, wherein the fastening includes bonding the fluid oil tank structure to the radially outward side.

20. The method of claim 18, which further includes inserting a fluid fill tube through the gas turbine engine bypass duct wall.

\* \* \* \* \*

UNITED STATES PATENT AND TRADEMARK OFFICE
CERTIFICATE OF CORRECTION

| | | |
|---|---|---|
| PATENT NO. | : 8,627,667 B2 | Page 1 of 1 |
| APPLICATION NO. | : 12/715961 | |
| DATED | : January 14, 2014 | |
| INVENTOR(S) | : Thomas S. Lozier et al. | |

It is certified that error appears in the above-identified patent and that said Letters Patent is hereby corrected as shown below:

Title page, replace (73) Assignee: Roll-Royce Corporation, Indianapolis, IN (US)

with

(73) Assignee: Rolls-Royce Corporation, Indianapolis, IN (US)

Signed and Sealed this
Fifteenth Day of April, 2014

Michelle K. Lee
*Deputy Director of the United States Patent and Trademark Office*